US012542041B2

(12) United States Patent
Capek

(10) Patent No.: US 12,542,041 B2
(45) Date of Patent: Feb. 3, 2026

(54) SELF-TESTING SMOKE DETECTOR HAVING AN ELECTROCHROMIC FILM

(71) Applicant: Carrier Corporation, Palm Beach Gardens, FL (US)

(72) Inventor: Tyler Capek, Vadnais Heights, MN (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 125 days.

(21) Appl. No.: 18/627,429

(22) Filed: Apr. 4, 2024

(65) Prior Publication Data

US 2024/0346900 A1 Oct. 17, 2024

Related U.S. Application Data

(60) Provisional application No. 63/496,407, filed on Apr. 16, 2023.

(51) Int. Cl.
*G08B 17/107* (2006.01)

(52) U.S. Cl.
CPC .................................. *G08B 17/107* (2013.01)

(58) Field of Classification Search
CPC .................................................... G08B 17/107
See application file for complete search history.

(56) References Cited

U.S. PATENT DOCUMENTS 5,497,144 A * 3/1996 Schappi ............... G08B 29/145 340/630
5,629,671 A 5/1997 Morita
7,167,098 B2 1/2007 Siber et al.
8,228,182 B2 7/2012 Orsini et al.
8,681,012 B2 3/2014 Murray et al.
9,959,748 B2 5/2018 Moffa
10,825,333 B2 11/2020 Harris et al.
10,825,334 B2 11/2020 Pedersen et al.
(Continued)

FOREIGN PATENT DOCUMENTS

CN 114112074 B 11/2023
DE 102011088850 B3 4/2013
(Continued)

OTHER PUBLICATIONS

European Search Report for Application No. 24170655.5, Issued Sep. 13, 2024, 8 Pages.

*Primary Examiner* — Hoi C Lau
(74) *Attorney, Agent, or Firm* — CANTOR COLBURN LLP

(57) ABSTRACT

A self-testing smoke detector is disclosed that includes a base and an optical cover positioned on the base and adapted to form an optical cavity with the base, allowing the smoke to enter therein. The self-testing smoke detector also includes a light source positioned in the base and adapted to illuminate the optical cavity. In addition, the self-testing smoke detector includes an electrochromic film disposed in a path of light produced by the light source and adapted to vary an intensity of illumination. The self-testing smoke detector also includes a photodiode unit positioned in the base and adapted to detect a change in the intensity of illumination in the optical cavity, wherein the change in the intensity of illumination is indicative of an active status of the light source and the photodiode unit.

11 Claims, 8 Drawing Sheets

(56) References Cited

U.S. PATENT DOCUMENTS

| | | | | |
|---|---|---|---|---|
| 11,205,331 | B2 * | 12/2021 | Pilli | G08B 21/182 |
| 2018/0061215 | A1 * | 3/2018 | Vollenweider | G08B 17/117 |
| 2018/0204435 | A1 * | 7/2018 | Hilsinger | G01N 21/88 |
| 2019/0221084 | A1 * | 7/2019 | Merkle | G02F 1/133609 |
| 2019/0346595 | A1 * | 11/2019 | Godfrey | G02B 5/0236 |
| 2021/0327236 | A1 * | 10/2021 | Pilli | G08B 17/10 |
| 2024/0346900 | A1 * | 10/2024 | Capek | G08B 29/145 |

FOREIGN PATENT DOCUMENTS

| | | | |
|---|---|---|---|
| EP | 0055319 | B1 | 2/1985 |
| EP | 1376506 | B1 | 7/2006 |
| EP | 2028631 | A2 | 2/2009 |
| EP | 2405412 | A1 | 1/2012 |
| JP | 2002197558 | A | 7/2002 |

* cited by examiner

102

102

SELF-TESTING SMOKE DETECTOR HAVING AN ELECTROCHROMIC FILM

CROSS REFERENCE TO A RELATED APPLICATION

The application claims the benefit of U.S. Provisional Application No. 63/496,407 filed Apr. 16, 2023, the contents of which are hereby incorporated in their entirety.

FIELD OF THE INVENTION

The disclosure relates to smoke detectors. More particularly, the disclosure relates to a self-testing smoke detector having an electrochromic film.

BACKGROUND

A smoke detector is a safety device used to detect smoke in a space, such as an office space or a warehouse. The smoke detector can either be ionization type or photoelectric type. The photoelectric-type smoke detector uses a light-emitting diode (LED) that illuminates a chamber called a labyrinth and a photodiode that detects the light from the LED in the presence of smoke in the chamber. During the working of the photoelectric-type smoke detector, the smoke enters the chamber and scatters the light from the LED. The scattered light is detected by the photodiode and accordingly, the smoke detector generates an alarm.

The smoke detectors are checked for their normal working during a maintenance check. During the scheduled maintenance check, an operator uses an aerosol-based smoke generator, commonly known as a "smoke-in-a-can" device that generates the smoke. Further, the operator approaches the smoke detector with the smoke generator generating the smoke to simulate a fire scenario. In case the smoke detector generates the alarm during the simulated fire scenario, the smoke detector is considered to be operating normally. There are various limitations associated with such a maintenance process. For instance, the operator has to individually check each smoke detector which makes the testing process a tedious task. Moreover, the maintenance check warrants the use of smoke generators and the non-availability of the smoke generator may affect the maintenance check.

Recent developments have resulted in the development of self-testing smoke detectors. One type of self-testing smoke detector uses a retractable prism that can extend into the smoke chamber to scatter the light for the photodiode to detect. Such self-testing smoke detectors are prone to mechanical failures. Moreover, the self-testing smoke detector tends to consume lots of electricity during their testing.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

Disclosed herein is a self-testing smoke detector that includes a base and an optical cover positioned on the base and adapted to form an optical cavity with the base, allowing the smoke to enter therein. The self-testing smoke detector also includes a light source positioned in the base and adapted to illuminate the optical cavity. In addition, the self-testing smoke detector includes an electrochromic film disposed in a path of light produced by the light source and adapted to vary an intensity of illumination. The self-testing smoke detector also includes a photodiode unit positioned in the base and adapted to detect a change in the intensity of illumination in the optical cavity, wherein the change in the intensity of illumination is indicative of an active status of the light source and the photodiode unit.

In one or more embodiments, the light source includes a pair of light-emitting diodes disposed in a pair of first seats of the base.

In one or more embodiments, the photodiode unit includes a pair of photo-diode sensors disposed in a pair of second seats of the base.

In one or more embodiments, the electrochromic film is disposed at a mouth of each of the pair of first seats.

In one or more embodiments, a second seat of the pair of second seats is positioned proximate to a first seat of the pair of first seats.

In one or more embodiments, the electrochromic film is adapted to transition from a transparent state to a black-coloured state to reduce the intensity of illumination in the optical cavity.

In one or more embodiments, the electrochromic film is mounted on a ceiling of the optical cover and the light source is directed in a direction towards the electrochromic film.

In one or more embodiments, the electrochromic film is adapted to transition from the transparent state to a white-coloured state to increase the intensity of illumination in the optical cavity.

Also disclosed herein is a method for self-testing a smoke detector having a base and a labyrinth together defining an optical cavity is disclosed. The method may include actuating a light source of the self-testing smoke detector to illuminate the optical cavity. In addition, the method may include activating an electrochromic film installed in a path of light produced by the light source to vary an intensity of illumination in the labyrinth. Finally, the method may include detecting, by a photodiode unit of the self-testing smoke detector, a change in the intensity of illumination in the labyrinth, wherein the change in the intensity of illumination is indicative of an active status of the light source and the photodiode unit.

In one or more embodiments, activating the electrochromic film by providing an electric current to transition the electrochromic film from a transparent state to a black-coloured state to reduce the intensity of illumination in the optical cavity.

In one or more embodiments, activating the electrochromic film by providing an electric current to transition the electrochromic film from a transparent state to a white-coloured state to increase the intensity of illumination in the optical cavity.

To further clarify the advantages and features of the invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
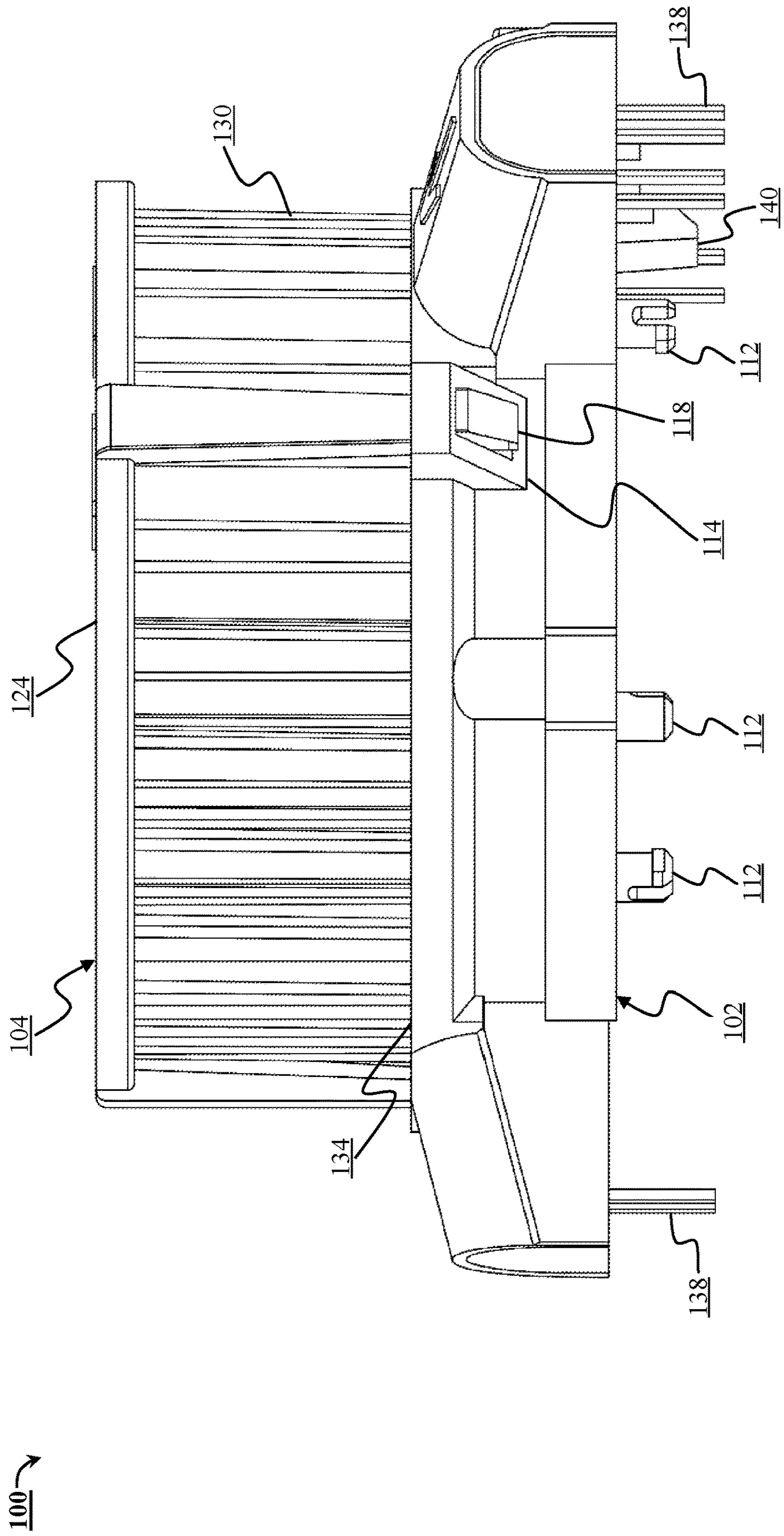
FIG. 1 illustrates an assembled view of a self-testing smoke detector.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having the benefit of the description herein.

DETAILED DESCRIPTION OF FIGURES

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

Figure 2A:
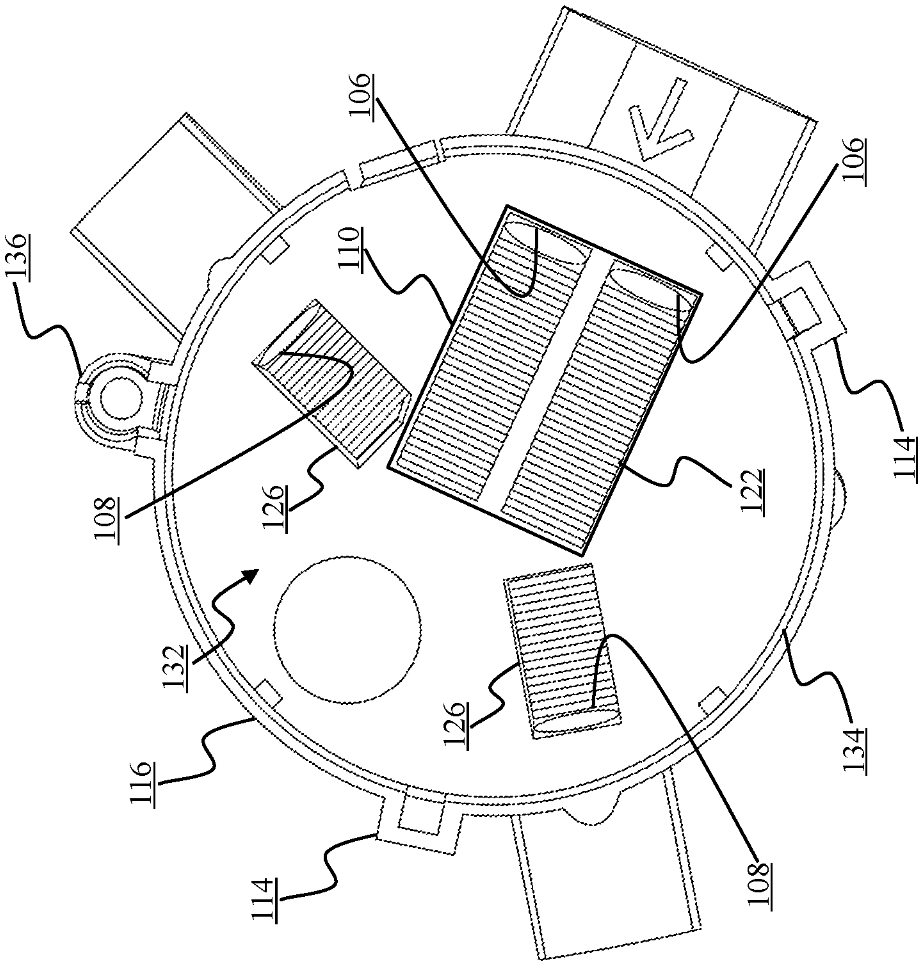
FIG. 2A illustrates a top view of a base and an electrochromic film of the self-testing smoke detector.
Figure 2B:
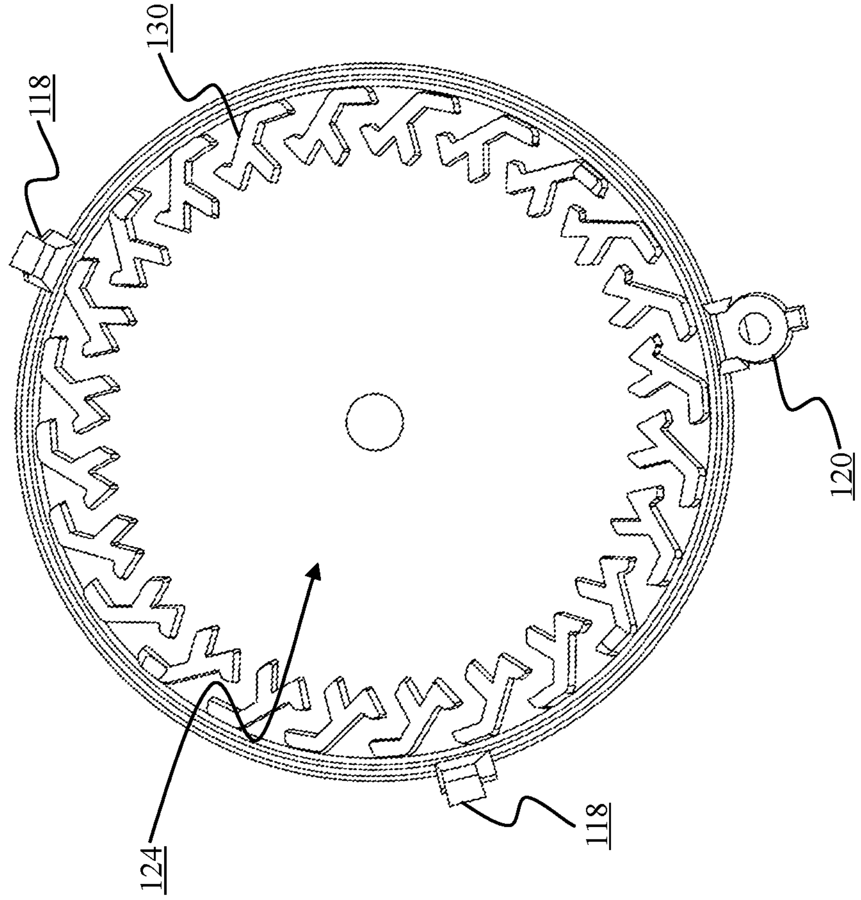
FIG. 2B illustrates a top view of a cover of the self-testing smoke detector.

FIGS. 1 to 2A, and 2B illustrate different aspects of a self-testing smoke detector 100 that can detect smoke present in a space where the self-testing smoke detector 100 is installed. Specifically, FIG. 1 illustrates an assembled self-testing smoke detector 100. Further, FIG. 2A illustrates a top view of a base 102 and an electrochromic film 110 of the self-testing smoke detector and FIG. 2B illustrates a top view of a cover 104 of the self-testing smoke detector 100. The space may have a plurality of self-testing smoke detectors 100 installed in different regions to detect the presence of smoke in one or more regions of the space. The self-testing smoke detector 100 is also capable of performing an operational test to check if the self-testing smoke detector 100 is in an active state. The self-testing smoke detector 100 has structural components that enable the self-testing smoke detector 100 to perform the self-testing test without any human intervention. In one example, the self-testing smoke detector 100 is capable.

The self-testing smoke detector 100 is an optical smoke alarm that operates based on a detection of a change in light intensity caused by the smoke. Accordingly, the self-testing smoke detector 100 may include the base 102 and the optical cover 104 installed on the base 102. The base 102 and the optical cover 104 together form an optical cavity that allows the smoke to enter therein. The base 102 accommodates various sub-components of the self-testing smoke detector 100, such as a light source 106, a photodiode unit 108, and an electrochromic film 110, details of which will be explained later.

The base 102 may include a plurality of pegs 112 provided on a rear end of the base 102 that allows a printed circuit board (not shown) to be installed on the base 102. The pegs 112 allow easy mounting and dismounting of the PCB that has the electronic components mounted thereon. The base 102 may also include a plurality of electric pins 138 that extend from the rear end and are configured to transfer electronic signals through the light source 106, the photodiode unit 108, and the electrochromic film 110. In addition, the base 102 may include additional clips 140 to mount/dismount the PCB. The pegs 112 and the clip 140 allow for easy PCB installation/uninstallation thereby making the self-testing smoke detector 100 serviceable. Although not shown, the base 102 may include a lower housing underneath adapted to couple to the base 102 and attaches the base 102 to a structure, such as a ceiling.

Referring to FIG. 2A, the base 102 also includes a plurality of latches 114 on a periphery 116 of the base 102 that may receive snap locks 118 of the optical cover 104 to removably attach the optical cover 104 to the base 102. Further, the base 102 may include a hole 136 that, when aligned with a hole 120 on the optical cover 104, receives a fastener (not shown) to secure the optical cover 104 to the base 102. The combination of the snap locks 118 and the fasteners enable a tight fit between the optical cover 104 and the base 102, thereby preventing dust from entering the optical cavity.

The base 102 may include a plurality of seats to accommodate the light source 106 and the photodiode unit 108. In the illustrated embodiment, the base 102 may include a pair of first seats 122 that may accommodate the light source 106. The pair of first seats 122 may be adjacent to each other in such that the light source 106 projects parallel light waves. Further, a first seat 122 of the pair may extend through a height of the base 102 and may be aligned with an input port for the light source 106.

In one example, the light source 106 may include a pair of light-emitting diodes (LEDs) that are installed in each seat of the pair of first seats 122. The LEDs are aimed in such that the emitted light is projected on a ceiling 124 of the optical cover 104. Further, the emitted light when scattered by the smoke illuminates the complete optical cavity.

The base 102 may also include a pair of second seats 126 that are formed and arranged in a predefined orientation with respect to the pair of first seats 122. In the illustrated embodiment, a second seat 126 of its pair is adjacent to a first seat 122 of its pair. The photodiode unit 108 installed in the second seat 126 may sense an intensity of illumination in the optical cavity. In addition, the photodiode unit 108 is adapted to sense a change in the intensity of illumination in the optical cavity. Further, the change in the intensity of the illumination may be caused by the presence of smoke. On the other hand, the change in the intensity of the illumination may be caused by the electrochromic film 110 during a self-test mode. During the self-test mode, the detection of the change in the intensity of illumination by the electrochromic film 110 is indicative of the active status of the photodiode unit 108 and the light source 106.

Referring to FIG. 2B, the optical cover 104 is installed over the base 102 in such a way that the first seat 122 and the second seat 126 completely cover the optical cover 104. The optical cover 104 may have a ceiling portion 128 that may also define a top end of the smoke detector 100. The optical cover 104 may also include a plurality of pillars 130 on its periphery defining a circular wall. Each pillar 130 may have a predefined profile, such that adjacent pillars 130 define a path that allows the smoke to enter the optical cavity while preventing ambient light from entering the optical cavity. Further, the pillars 130 are arranged in such a way that a tip of each pillar 130 makes contact with a top surface 132 of the base 102. As shown in FIG. 1, the base 102 may have a flange 134 that covers a bottom of the pillar 130, such that smoke or dust is prevented from entering the optical cavity from the bottom of the pillar 130.

In this embodiment, the optical cover 104 and the base 102 may have a cylindrical profile. However, other profiles, such as a cuboidal or conical profile may also be envisioned.

According to this disclosure, the electrochromic film 110 can be installed at different places as long as the electrochromic film 110 is disposed in the path of light coming from the light source 106. In one example, the electrochromic film 110 may be installed at a mouth of the first seat 122 as shown in FIG. 2. Further, the electrochromic film 110 may be designed in such a way that the electrochromic film 110 changes the intensity of illumination in the optical cavity, for instance, reducing or increasing the intensity of light. An exemplary implementation of the electrochromic film 110 that reduces the intensity of illumination is explained with respect to FIG. 3. Moreover, the electrochromic film 110 may be actuated during the self-testing mode and remains unactuated during the normal operation of the smoke detector 100. Moreover, the electrochromic film 110 draws small power thereby making its usage efficient.

Figure 3A:
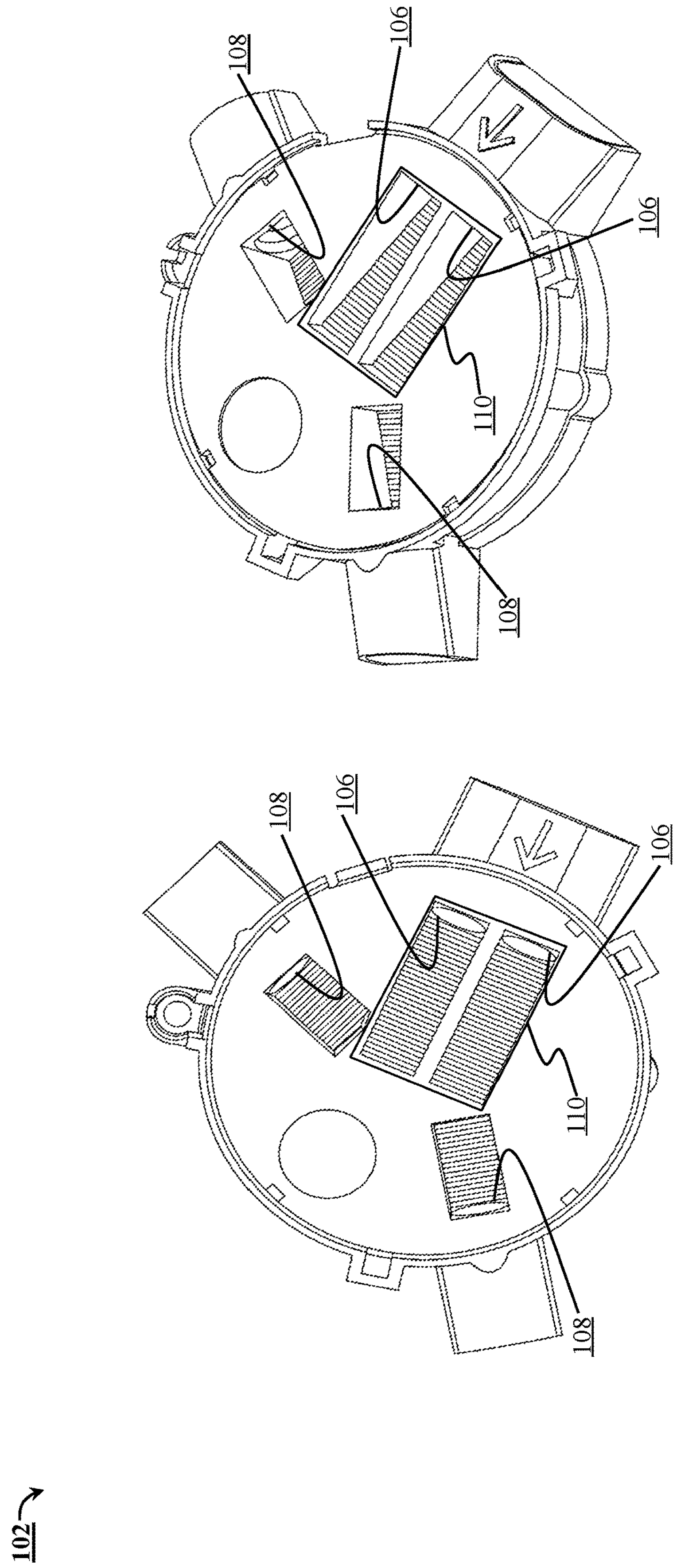
FIG. 3A illustrates the base with an electrochromic film in a transparent state.
Figure 3B:
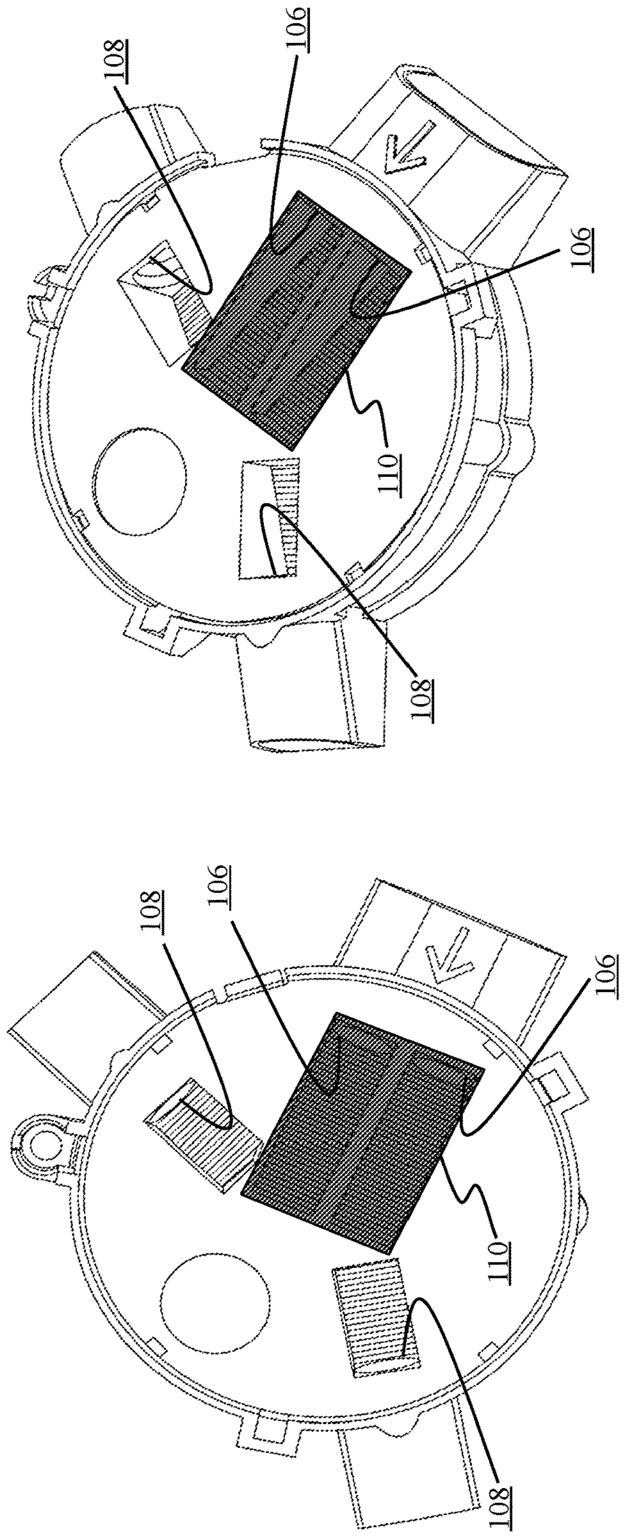
FIG. 3B illustrates the base with the electrochromic film in a black-coloured state to reduce the intensity of illumination in the optical cavity.

FIGS. 3A and 3B illustrates the base 102 with the electrochromic film 110 adapted to turn from a transparent state to a black-coloured state to reduce the intensity of illumination in the optical cavity. Specifically, FIG. 3A illustrates the base 102 with the electrochromic film 110 in a transparent state whereas FIG. 3B illustrates the base 102 with the electrochromic film 110 in the black-coloured state to reduce the intensity of illumination in the optical cavity. During a normal operation, the electrochromic film 110 may remain transparent as shown in FIG. 3A thereby allowing the light from the light source 106 to illuminate the optical cavity and the photodiode unit 108 senses the constant intensity of illumination. In the case of a fire, as the smoke enters the optical cavity through the optical cover 104 (shown in FIG. 1), the smoke scatters the lights thereby reducing the intensity of illumination in the optical cavity and such a change in the intensity is detected by the photodiode unit 108 to triggers an alarm.

During the self-test mode, the electrochromic film 110 may be actuated by supplying an electric current to the electrochromic film 110. Upon receiving the current, the electrochromic film 110 turns black thereby simulating the presence of smoke in the optical cavity as shown in view FIG. 3B. In case the photodiode unit 108 detects the change in the intensity of illumination, the photodiode unit 108 may generate a signal indicative of an active status of the photodiode unit 108 and the light source 106. In other words, the active status means that both the photodiode unit 108 and the light source 106 are working normally and there is no fault in the smoke detector 100. On the other hand, in case the photodiode unit 108 does not detect a change in the intensity of illumination when the electrochromic film 110 film turns black, it is determined that the light source 106 and/or the photodiode unit 108 are in an inactive state and repair may be needed to fix the fault.

Figure 4:
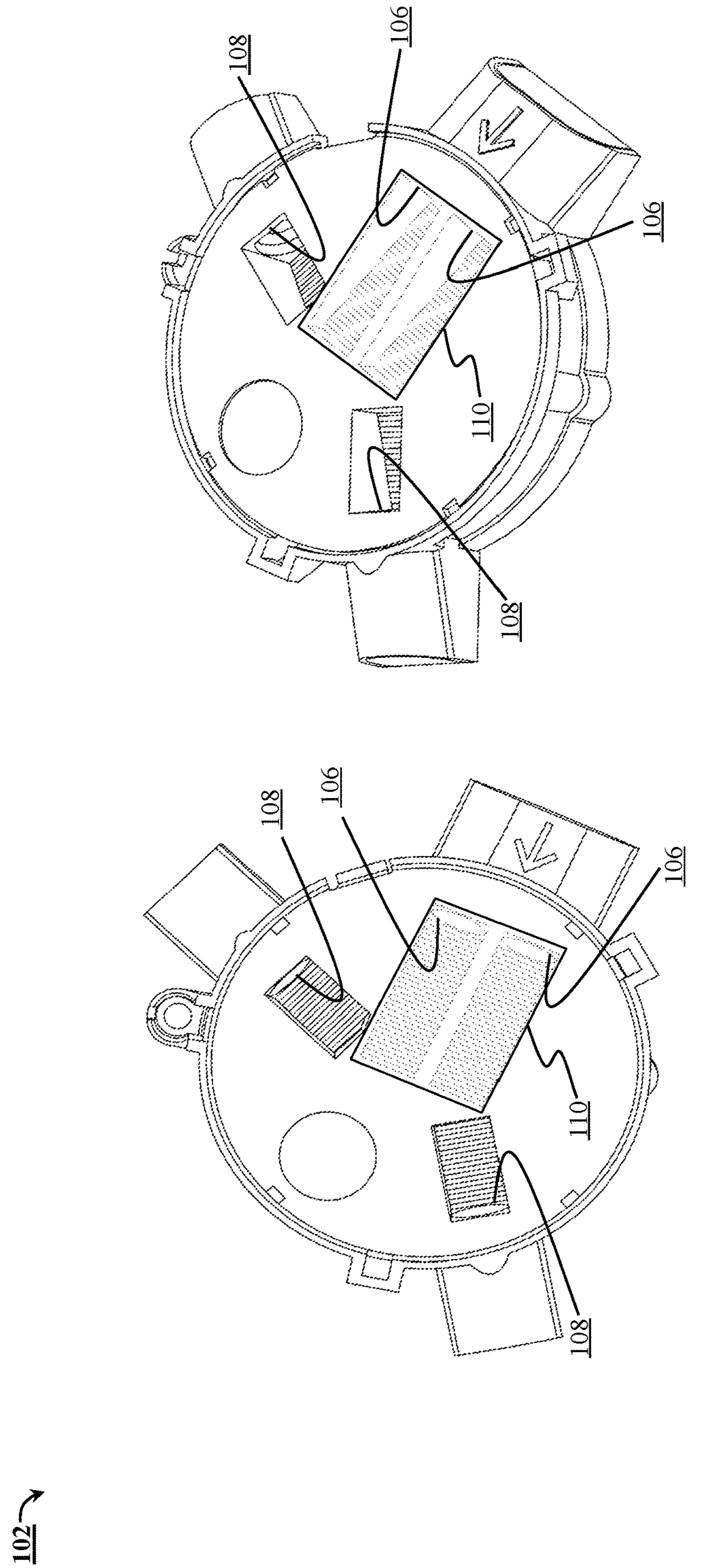
FIG. 4 illustrates the base with an electrochromic film adapted to turn from a transparent state to a white-coloured state to reduce the intensity of illumination in the optical cavity.

According to this disclosure, the electrochromic film 110 may also increase the intensity of illumination to change the intensity of illumination. Such an exemplary embodiment is explained with respect to FIG. 4. Specifically, FIG. 4 illustrates the base 102 with the electrochromic film 110 adapted to transition from a transparent state to a white-coloured state to reduce the intensity of illumination in the optical cavity. During normal operation, the electrochromic film 110 may remain transparent as shown in FIG. 3A thereby allowing the light from the light source 106 to illuminate the optical cavity. In this case, the light does not reach the photodiode unit 108 and accordingly, the photodiode unit 108 does not sense the change in the intensity of illumination. In the case of a fire, as the smoke enters the optical cavity through the optical cover 104 (shown in FIG. 1), the smoke scatters the lights thereby increasing the intensity of illumination in the optical cavity and such an increase in the intensity is detected by the photodiode unit 108 to triggers an alarm.

In the case of the self-test mode, the electrochromic film 110 may be actuated by supplying an electric current to the electrochromic film 110. Upon receiving the current, color of the electrochromic film 110 turns white thereby simulating the presence of smoke in the optical cavity as shown in FIG. 4. In case the photodiode unit 108 detects the change in the intensity of illumination, the photodiode unit 108 may generate a signal indicative of an active status of the photodiode unit 108 and the light source 106. On the other hand, in case the photodiode unit 108 does not detect a change in the intensity of illumination when the electrochromic film 110 film turns white, it is interpreted that either the light source 106 or the photodiode unit 108 or both are in an inactive state and repair may be needed to fix the fault.

Figure 5:
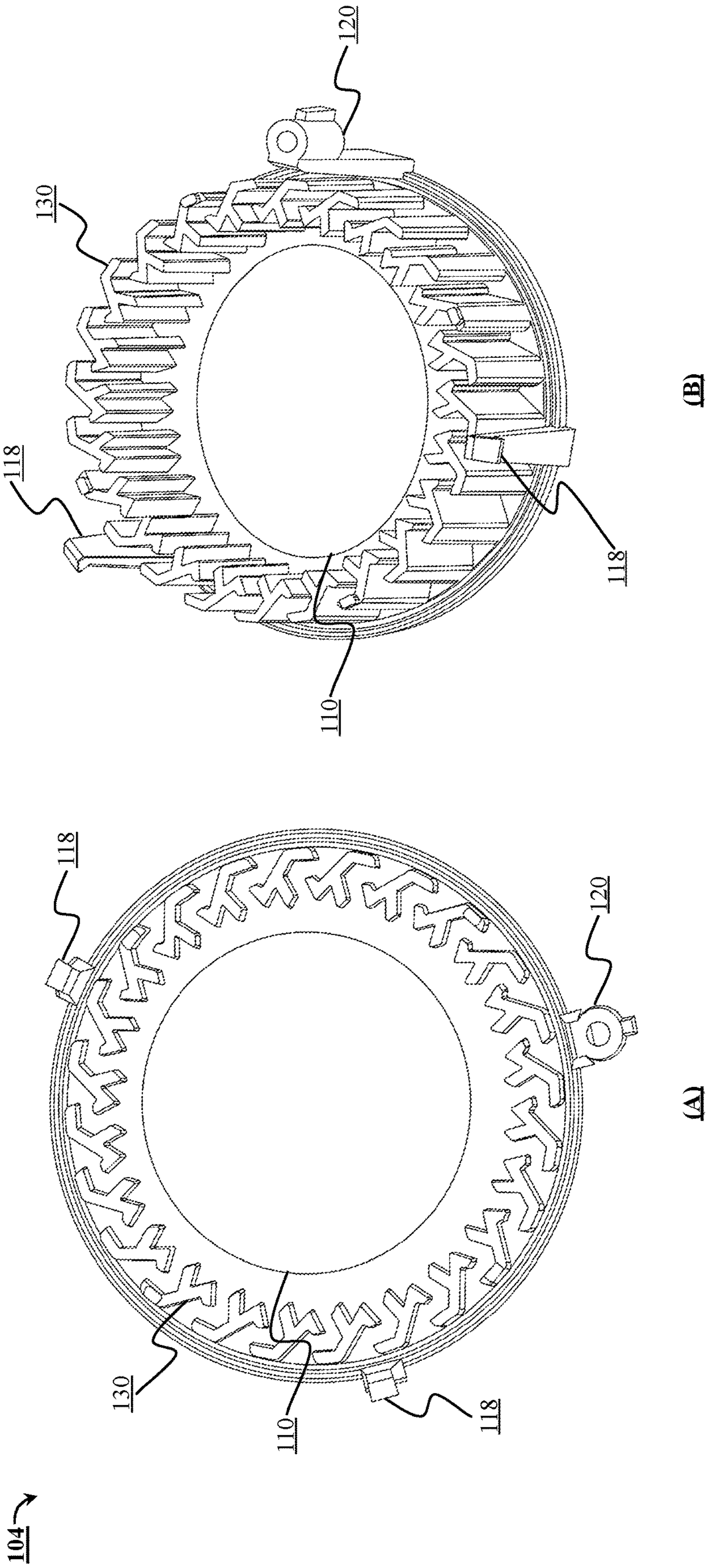
FIG. 5 illustrates a top view and a perspective view of the optical cover with an electrochromic film mounted on a ceiling of the optical cover.

According to this disclosure, the electrochromic film 110 may also be formed on a ceiling on the optical cover 104 to even scatter the emitted light thereby ensuring a homogenous change in the intensity of illumination. Such an exemplary embodiment is shown in FIG. 5 which illustrates the optical cover 104 with the electrochromic film 110 mounted on a ceiling 124 of the optical cover 104. During normal operation, the electrochromic film 110 may remain in the transparent state, such that the light is not scattered by the electrochromic film 110 as shown in view 5(A). Further, during the self-test mode, an electric current is supplied that may cause the electrochromic film 110 to transition from the transparent state to the white-coloured state to increase the intensity of illumination in the optical cavity as shown in view 5(B). The increase in the intensity of the illumination may be detected by the photodiode unit 108.

This disclosure also relates to a method 600 for self-testing the smoke detector 100 having the base 102 and the optical cover 104 together defining the optical cavity. The order in which the method steps are described below is not intended to be construed as a limitation, and any number of the described method steps may be combined in any appropriate order to execute the method or an alternative method. Additionally, individual steps may be deleted from the method without departing from the spirit and scope of the subject matter described herein.

Figure 6:
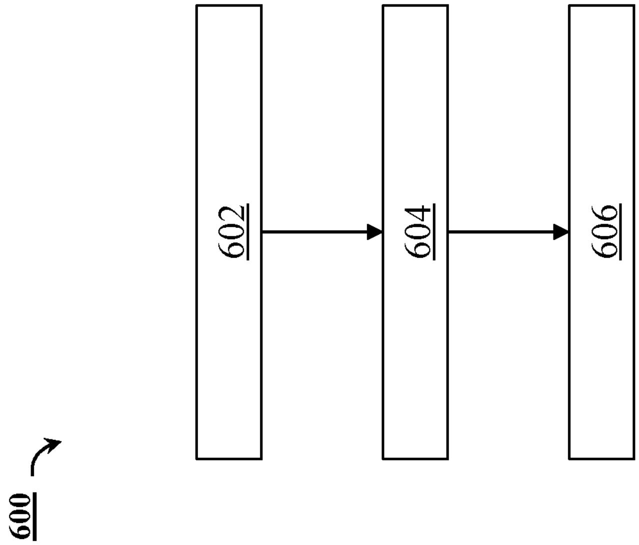
FIG. 6 illustrates a method for self-testing a smoke detector.

In one example, the method 600 may be performed partially or completely by the smoke detector 100 shown in FIGS. 1 and 2. The method 600 begins at step 602, at which the light source 106 of the self-testing smoke detector 100 is actuated to illuminate the optical cavity. Once illuminated, at step 604, the electrochromic film 110 installed in a path of light produced by the light source is activated. The activation of the electrochromic film 110 varies the intensity of illumination in the optical cavity. The activation can be performed by providing an electric current to transition the electrochromic film 110 from the transparent state to the black-coloured state to reduce the intensity of illumination in the optical cavity as shown in FIG. 3. Alternatively, the activation can be performed by providing an electric current to transition the electrochromic film 110 from the transparent state to the white-coloured state to reduce the intensity of illumination in the optical cavity as shown in FIG. 4 or 6. In either case, the change in the intensity is sensed by the photodiode unit 108 at step 606. The change in the intensity of illumination is indicative of an active status of the light source and the photodiode unit 108. On the other hand, in case the change in the intensity is not detected, there may be a fault in the photodiode unit 108 or the light source 106 or both.

According to this disclosure, the self-testing smoke detector 100 is capable of performing self-testing. Moreover, since the self-testing smoke detector 100 uses the electrochromic film for the self-testing, the self-testing smoke detector 100 has a simpler construction than the currently known smoke detectors that use additional mechanical implements. Furthermore, the electrochromic film 110 is configured to draw electric current during the self-testing and does not draw electric current during normal operation. Therefore, the self-testing of the self-testing smoke detector 100 is an energy-efficient process.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A self-testing smoke detector comprising:

a base;

an optical cover positioned on the base and adapted to form an optical cavity with the base, allowing the smoke to enter therein;

a light source positioned in the base and adapted to illuminate the optical cavity;

an electrochromic film disposed in a path of light produced by the light source and adapted to vary an intensity of illumination in the optical cavity; and a photodiode unit positioned in the base and adapted to detect a change in the intensity of illumination, wherein the change in the intensity of illumination is indicative of an active status of the light source and the photodiode unit.

2. The self-testing smoke detector of claim 1, wherein the light source includes a pair of light emitting diodes disposed in a pair of first seats of the base.

3. The self-testing smoke detector of claim 1, wherein the photodiode unit includes a pair of photo-diode sensors disposed in a pair of second seats of the base.

4. The self-testing smoke detector of claim 1, wherein the electrochromic film is disposed at a mouth of each of the pair of first seats.

5. The self-testing smoke detector of claim 3, wherein a second seat of the pair of second seats is positioned proximate to a first seat of the pair of first seats.

6. The self-testing smoke detector of claim 1, wherein the electrochromic film is adapted to transition from a transparent state to a black-coloured state to reduce the intensity of illumination in the optical cavity.

7. The self-testing smoke detector of claim 1, wherein the electrochromic film is mounted on a ceiling of the optical cover and the light source is directed in a direction towards the electrochromic film.

8. The self-testing smoke detector of claim 1, wherein the electrochromic film is adapted to transition from the transparent state to a white-coloured state to increase the intensity of illumination in the optical cavity.

9. A method for self-testing a smoke detector having a base and an optical cover together defining an optical cavity, comprising:

actuating a light source of the self-testing smoke detector to illuminate the optical cavity;

activating an electrochromic film installed in a path of light produced by the light source to vary an intensity of illumination in the optical cover; and detecting, by a photodiode unit of the self-testing smoke detector, a change in the intensity of illumination in the optical cavity, wherein the change in the intensity of illumination is indicative of an active status of the light source and the photodiode unit.

10. The method according to claim 9, comprises activating the electrochromic film by providing an electric current to transition the electrochromic film from a transparent state to a black-coloured state to reduce the intensity of illumination in the optical cavity.

11. The method according to claim 9, comprises activating the electrochromic film by providing an electric current to transition the electrochromic film from a transparent state to a white-coloured state to increase the intensity of illumination in the optical cavity.

* * * * *